United States Patent
Wang

(10) Patent No.: US 10,732,259 B2
(45) Date of Patent: *Aug. 4, 2020

(54) THRESHOLDS FOR TRANSMITTING WEATHER DATA

(71) Applicant: Honeywell International Inc., Morris Plains, NJ (US)

(72) Inventor: Haiming Wang, Beijing (CN)

(73) Assignee: Honeywell international Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/239,263

(22) Filed: Jan. 3, 2019

(65) Prior Publication Data

US 2019/0137599 A1    May 9, 2019

Related U.S. Application Data

(63) Continuation of application No. 15/277,638, filed on Sep. 27, 2016, now Pat. No. 10,215,840.

(51) Int. Cl.
*G01S 7/00* (2006.01)
*G01C 21/36* (2006.01)
(Continued)

(52) U.S. Cl.
CPC .......... *G01S 7/003* (2013.01); *G01C 21/3691* (2013.01); *G01C 23/005* (2013.01);
(Continued)

(58) Field of Classification Search
CPC ...... G01S 13/953; G01S 7/003; G01S 13/951; G01S 13/95; G01W 2001/006; G01W 1/00; G01W 1/10; G08G 5/0091; G08G 5/0013

See application file for complete search history.

(56) References Cited

U.S. PATENT DOCUMENTS 6,828,922 B1    12/2004 Gremmert et al.
8,314,730 B1    11/2012 Musiak et al.
(Continued)

FOREIGN PATENT DOCUMENTS

EP    2933663 A2    10/2015

OTHER PUBLICATIONS

Intent to Grant dated Mar. 28, 2019, from counterpart European Application No. 18192901.9, 35 pp.

(Continued)

*Primary Examiner* — Olumide Ajibade Akonai
(74) *Attorney, Agent, or Firm* — Shumaker & Sieffert, P.A.

(57) ABSTRACT

A method for processing weather data, where the method includes receiving, at a vehicle and from a base station, a request for weather data, wherein the request comprises an indication of a specified location in space for the weather data. The method further includes determining two or more parameters, wherein a first parameter of the two or more parameters comprises a distance between the vehicle and the specified location in space. The method further includes calculating a confidence level based on the two or more parameters, wherein the confidence level indicates an estimated accuracy for the weather data obtained from the vehicle. The method further includes determining whether the confidence level exceeds a threshold level and determining whether to transmit the weather data to the base station based on whether the confidence level exceeds the threshold level.

20 Claims, 8 Drawing Sheets

(51) Int. Cl.
*G01W 1/00* (2006.01)
*G01W 1/10* (2006.01)
*G01S 13/95* (2006.01)
*G01C 23/00* (2006.01)
*G06K 9/62* (2006.01)

(52) U.S. Cl.
CPC .......... *G01S 13/951* (2013.01); *G01S 13/953* (2013.01); *G01W 1/00* (2013.01); *G01W 1/10* (2013.01); *G06K 9/6288* (2013.01); *G01W 2001/006* (2013.01); *Y02A 90/18* (2018.01)

(56) References Cited

U.S. PATENT DOCUMENTS

| | | | |
|---|---|---|---|
| 9,223,020 B1 | 12/2015 | Crosmer et al. | |
| 9,535,158 B1 | 1/2017 | Breiholz et al. | |
| 10,151,834 B2* | 12/2018 | Wang | G01S 13/953 |
| 10,215,840 B2* | 2/2019 | Wang | G01S 7/003 |
| 10,371,793 B2* | 8/2019 | Wang | G01S 7/003 |
| 2014/0336935 A1 | 11/2014 | Zhu et al. | |
| 2014/0358441 A1 | 12/2014 | Hale et al. | |
| 2015/0109146 A1 | 4/2015 | Drobot et al. | |
| 2015/0304813 A1 | 10/2015 | Esposito et al. | |
| 2016/0092615 A1 | 3/2016 | Stenneth et al. | |
| 2018/0088209 A1 | 3/2018 | Wang | |

OTHER PUBLICATIONS

Response to Extended Search Report dated Nov. 2, 2018, from counterpart European Application No. 18192901.9, filed Feb. 8, 2019, 3 pp.

Extended European Search Report and Written Opinion from counterpart European Patent Application No. 17191992.1, dated Jan. 30, 2018, 5 pp.

Text Intended to Grant from counterpart European Application No. 17191992.1, dated May 9, 2018, 34 pp.

Extended Search Report from counterpart European Application No. 18192901.9, dated Nov. 2, 2018, 8 pp.

Prosecution History from U.S. Appl. No. 15/277,638, dated Oct. 4, 2018 through Dec. 31, 2018, 16 pp.

* cited by examiner

THRESHOLDS FOR TRANSMITTING WEATHER DATA

This application is a continuation of U.S. application Ser. No. 15/277,638, filed on Sep. 27, 2016, the entire content of which is incorporated by reference herein.

TECHNICAL FIELD

This disclosure relates to weather radar systems, specifically to the collection and transmission of weather data.

BACKGROUND

A vehicle such as an aircraft may use an onboard weather radar system to detect weather conditions, which may enable the flight crew to make changes to the flight plan as necessary to avoid potentially hazardous weather. Weather information collected by an aircraft may also be transmitted to a base station where the base station may combine the aircraft-collected weather information with weather information from other sources in order to perform weather analysis. An aircraft in flight may also receive weather information from base stations. Up-to-date weather information may assist the flight crew and others in evaluating whether or how to modify a flight plan to ensure safety of the flight.

SUMMARY

This disclosure is directed to systems, devices, and methods for processing weather data and determining whether to transmit the weather data to a base station. A processor on a vehicle may determine whether to transmit weather data based on a set of parameters that indicate an estimated accuracy of the weather data. The techniques of this disclosure may reduce the amount of weather data transmitted to the base station on a communication channel while improving the quality of weather data received by the base station.

In some examples, a method for processing weather data includes receiving, at a vehicle and from a base station, a request for weather data, wherein the request comprises an indication of a specified location in space for the weather data. The method further includes determining two or more parameters, wherein a first parameter of the two or more parameters comprises a distance between the vehicle and the specified location in space. The method further includes calculating a confidence level based on the two or more parameters, wherein the confidence level indicates an estimated accuracy for the weather data obtained from the vehicle. The method further includes determining whether the confidence level exceeds a threshold level and determining whether to transmit the weather data to the base station based on whether the confidence level exceeds the threshold level.

In some examples, a system for processing weather data onboard a vehicle includes a transceiver configured to receive, from a base station, a request for weather data, wherein the request comprises an indication of a specified location in space for the weather data. The system further includes a processing circuitry configured to determine two or more parameters, wherein a first parameter of the two or more parameters comprises a distance between the vehicle and the specified location in space. The processing circuitry is further configured to calculate a confidence level based on the two or more parameters, wherein the confidence level indicates an estimated accuracy for the weather data obtained from the vehicle. The processing circuitry is further configured to determine whether the confidence level exceeds a threshold level and determine whether to transmit the weather data to the base station based on whether the confidence level exceeds the threshold level.

In some examples, a method for collecting weather data includes transmitting, at a base station and to a vehicle, an indication of a specified location in space for the weather data, and receiving, at the base station and from the vehicle, two or more parameters, wherein a first parameter of the two or more parameters comprises a distance between the vehicle and the specified location in space. The method further includes calculating a confidence level based on the two or more parameters, wherein the confidence level indicates an estimated accuracy for the weather data obtained from the vehicle. The method further includes determining whether the confidence level exceeds a threshold level, and transmitting, from the base station and to the vehicle, a request for weather data at the specified location in space based on whether the confidence level exceeds the threshold level.

The details of one or more examples are set forth in the accompanying drawings and the description below. Other features, objects, and advantages will be apparent from the description and drawings, and from the claims.

DETAILED DESCRIPTION

This disclosure is directed to systems, devices, and methods for processing weather data in response to a request for weather data at a specified location in space from a base station. Processing circuitry onboard a vehicle may calculate a confidence level based on parameters that relate to the location and course of the vehicle relative to the specified location in space. The processing circuitry may also determine whether to cause a transceiver to transmit the weather data based on whether the confidence level exceeds a threshold level.

The communication channel between an in-flight aircraft and a base station typically has limited bandwidth and is used for purposes other than just transmitting weather data. By refraining from transmitting the weather data if the confidence level does not exceed threshold level, the techniques of this disclosure may reduce the amount of weather-related data transmitted on the communication channel, thus potentially freeing up bandwidth for other purposes. The techniques of this disclosure may additionally or alternatively be used to improve the quality of data received by the base station, potentially enabling the base station to disseminate higher-quality weather data to other vehicles.

Figure 1:
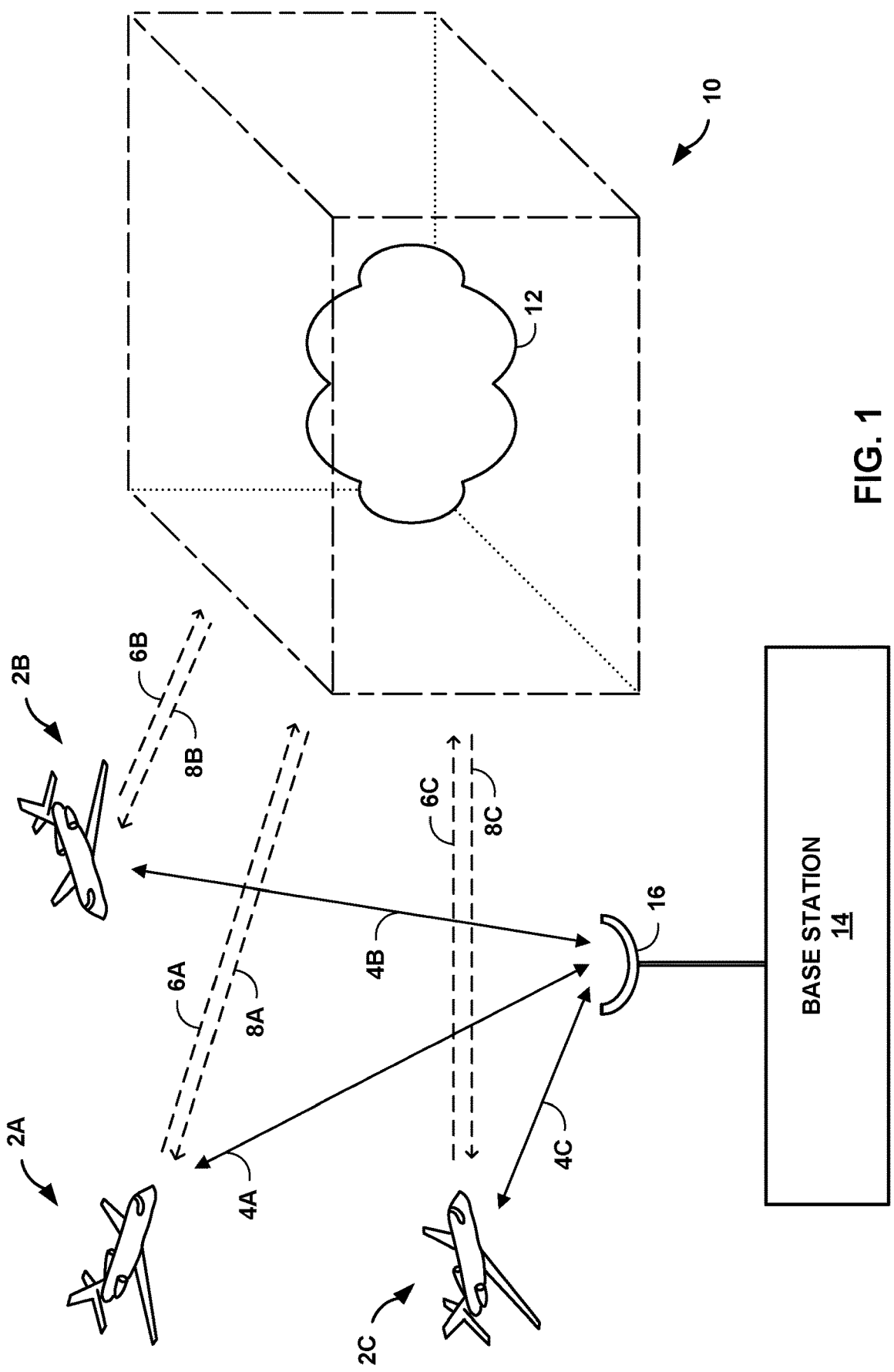
FIG. 1 illustrates a base station requesting weather data for a specified location in space from three vehicles, in accordance with some examples of this disclosure.

FIG. 1 illustrates a base station 14 requesting weather data for a specified location in space 10 ("location 10") from three vehicles 2A-2C, in accordance with some examples of this disclosure. FIG. 1 depicts vehicles 2A-2C as airplanes, but vehicles 2A-2C may include any mobile object or remote object that receives reflectivity data for location 10. In other examples, vehicles 2A-2C may include an aircraft such as a helicopter or a weather balloon. In yet other examples, vehicles 2A-2C may include a land vehicle such as an automobile or a water vehicle such as a ship or a submarine.

Vehicles 2A-2C may transmit and receive weather radar signals to collect weather data from location 10, where location 10 may represent a three-dimensional volume of space that is within range of a weather radar module of vehicles 2A-2C. In some examples, location 10 may be identified by a point in space defined by latitude, longitude, and altitude or identified by latitude and longitude and covering all altitudes or a range of altitudes. As will be explained in greater detail below, the latitude, longitude, and altitude information may be used to define spheres, cylinders, cubes, or other three-dimensional volumes corresponding to location 10. In the example of FIG. 1, base station 14 may transmit requests through communication channels 4A-4C to vehicles 2A-2C. The requests transmitted by base station 14 through communication channels 4A-4C may include an indication of a specified location in space for which base station 14 is seeking weather data from vehicles 2A-2C.

In the example of FIG. 1, location 10 includes cloud 12. Vehicles 2A-2C may transmit radar signals 6A-6C, and cloud 12 may reflect radar signals 6A-6C as reflected radar signals 8A-8C. A weather radar of vehicles 2A-2C may receive reflected radar signals 8A-8C. Reflected radar signals 8A-8C may include return echoes from a target such as cloud 12, a water droplet, a particle, or a molecule within location 10. Vehicles 2A-2C may process reflected radar signals b 8A-8C to determine the reflectivity for multiple data points within location 10. In some examples, vehicles 2A-2C may be inside of or outside of location 10.

Processing circuitry (e.g., one or more processors, not explicitly shown in FIG. 1) on vehicles 2A-2C may process and analyze reflectivity data using location data for vehicles 2A-2C, including latitude, longitude, and altitude data. The processing circuitry may also receive course data for vehicles 2A-2C from various sources such as one or more accelerometers, a compass, flight plans, and/or external sources, including direction, trajectory, and roll. The processing circuitry may use location data, course data, and return signals 6 to determine the reflectivity data for multiple data points within location 10. "Weather data" may include reflectivity data such as data relating to the moisture or particles in a volume of space. Weather data may also include data on precipitation, velocity and polarization of molecules and/or particles in space, wind speed and direction, sky cover, temperature, humidity, and the like.

Vehicles 2A-2C may include systems and devices for detecting the reflectivity of locations within location 10. The systems and devices within vehicles 2A-2C may process the reflectivity data into one-, two-, or three-dimensional representations or arrays. After processing the reflectivity data, the processing circuitry on vehicles 2A-2C may transmit data signals to base station 14, which may include transceiver 16. Transceiver 16 may include an antenna and/or a satellite dish. The systems and devices within vehicles 2A-2C may transmit weather data to base station 14 via Aircraft Communications Addressing and Reporting System (ACARS) using a protocol standard such as Aeronautical Radio, Incorporated (ARINC), seven-hundred series. In some examples, base station 14 may be on land, on water, or in the air and may be onboard a vehicle or at a stationary location.

In accordance with the techniques of this disclosure, a processing circuitry on vehicle 2A may receive a request from base station 14 for weather data at location 10. The processing circuitry on vehicle 2A may determine parameters such as a distance between the vehicle and location 10. The processing circuitry on vehicle 2A may calculate a confidence level indicating an estimated accuracy for the weather data. The processing circuitry on vehicle 2A determines whether to transmit the weather data to base station 14 based on whether the confidence level exceeds a threshold level, thereby conserving transmission resources and improving the quality of weather data received by base station 14.

Compared to each vehicle of vehicles 2A-2C transmitting weather data to base station 14, the techniques of this disclosure may reduce data throughput in the communication channel between vehicles 2A-2C and base station 14. Instead of receiving weather data from all of vehicles 2A-2C, base station 14 may establish a threshold level that ensures highly qualified vehicles of vehicles 2A-2C transmit weather data to base station 14. If base station 14 transmits a blind request (without knowing confidence level(s) of each vehicle), base station 14 may have difficulty determining the accuracy of the received weather data.

Figure 2:
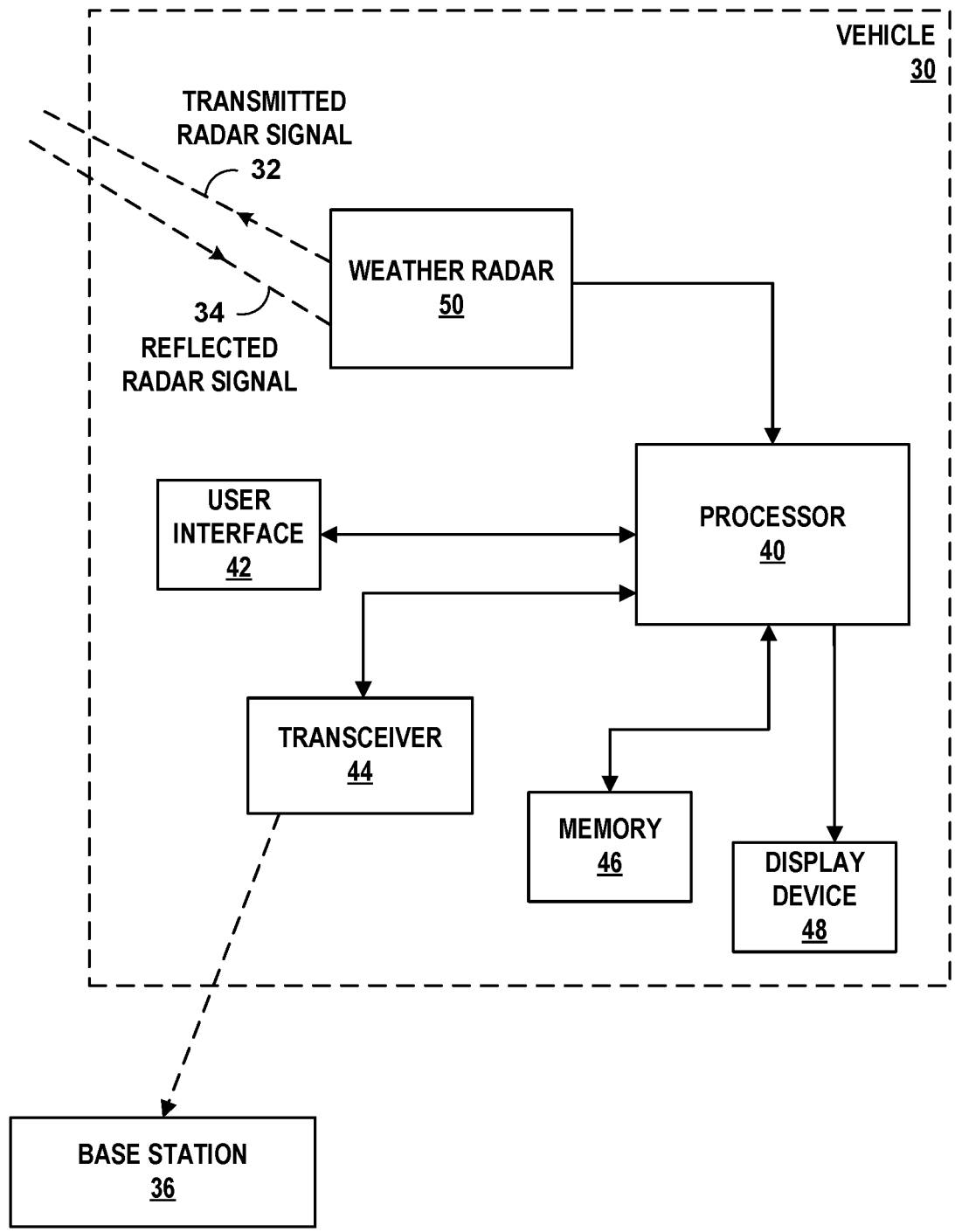
FIG. 2 is a conceptual block diagram of a processor and one or more transceivers in a vehicle for collecting and transmitting weather radar data to a base station, in accordance with some examples of this disclosure.

FIG. 2 is a conceptual block diagram of vehicle 30. Vehicle 30 includes processor 40 (e.g., processing circuitry) and one or more transceivers such as transceiver 44 and weather radar 50, which may include a transceiver, for collecting and transmitting weather radar data to a base station 36, in accordance with some examples of this disclosure. In the example of FIG. 2, vehicle 30 includes processor 40, user interface 42, transceiver 44, memory 46, display device 48, and weather radar 50. Processor 40 is communicatively coupled to user interface 42, transceiver 44, memory 46, display device 48, and weather radar 50. In some examples, vehicle 30 may correspond to one of vehicles 2A-2C as described in FIG. 1. Additionally, for ease of understanding, weather radar 50 has been described separate from processor 40, however, processor 40 and/or other processor(s) may be included in weather radar 50 or may control any portion of weather radar 50. Transceiver 44 and weather radar 50 may be one transceiver or may include more than two transceivers in some examples.

Weather radar 50 may include a transmitter and a receiver connected to an antenna. Weather radar 50 may also include a radar control that may control the intensity and direction of transmitted signal 32 that are emitted by an antenna of weather radar 50. Weather radar 50 may include any number of processors (not shown) required to perform the functions attributed to weather radar 50. The radar control may control the transmitter of weather radar 50 to transmit transmitted signal 32 that includes a waveform and a plurality of coherent pulses. The radar control may also control the receiver to receive return signal 34 via the antenna of weather radar 50.

Weather radar 50 receives return signal 34 from the scattering of transmitted signal 32 from the external environment including weather and terrain, which is delivered to and outputted by a receiver of weather radar 50 in a range bin to processor 40. In some examples, processor 40 may receive return signal 34 in a range bin and determine the signal power measurement of return signal 34 based on the waveform of return signal 34. In some examples, processor 40 may receive return signal 34 in the range bin and determine Doppler spectral information based on the plurality of coherent pulses. In some examples, processor 40 may process the power signal measurement to estimate reflectivity values for ground and/or weather elements. In other examples, processor 40 may process the Doppler spectral information to estimate a signal power. In these examples, processor 40 may process the first signal power measurement to estimate reflectivity values for ground and/or weather elements.

Processor 40 may receive reflectivity data sampled for a three-dimensional volume of space from a receiver of weather radar 50 and generate a plurality of two-dimensional representations. Processor 40 may update estimates of weather reflectivity and ground normalized radar cross section contained in memory 46 (e.g., three-dimensional volumetric buffer) with the estimated reflectivity values. Processor 40 may output weather data by generating an image for presentation on display device 48 based on data stored in the three-dimensional volumetric buffer in memory 46. Processor 40 may also output weather data by causing user interface 42 to generate an alert based on the reflectivity data or cause display device 48 to display one or more two-dimensional representations. User interface 42 and display device 48 may be referred to as output devices for purposes of this disclosure.

Transceiver 44 may be configured to transmit reflectivity data to base station 36. The rate at which weather radar 50 collects reflectivity data may exceed the throughput of the transmission link between transceiver 44 in vehicle 30 and base station 36. As a result, processor 40 may determine whether transceiver 44 will transmit data to base station 36 based on whether a confidence level exceeds a threshold level stored to memory 46. Processor 40 may receive a request for weather data from base station 36 via transceiver 44. Processor 40 may calculate the confidence level to estimate the accuracy of weather data obtained by weather radar 50. The confidence level may be based on parameters received from one of transceiver 44 and weather radar 50 or from another source, such as satellite navigation or a compass.

Figure 3:
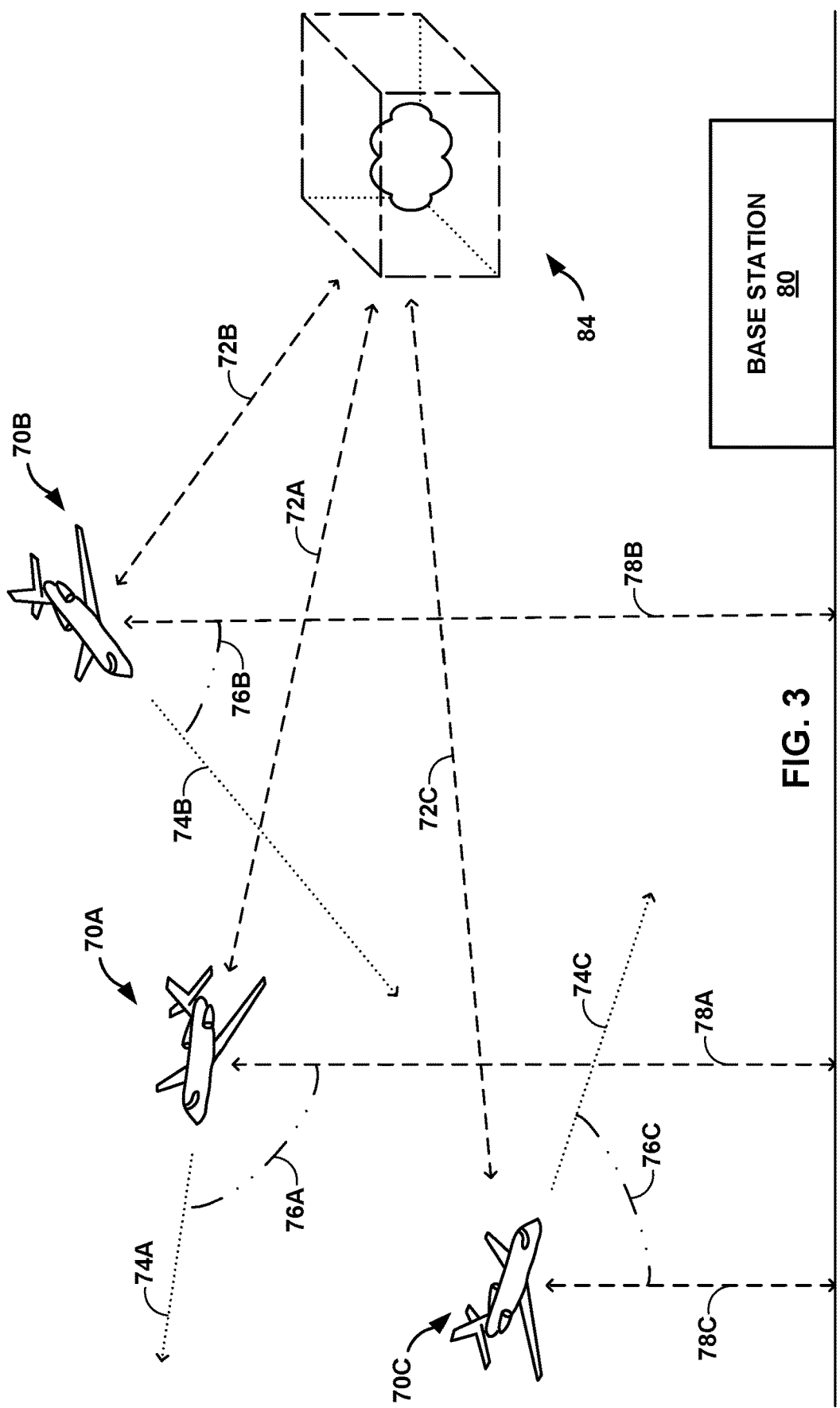
FIG. 3 illustrates the location and course of three vehicles relative to a specified location in space, in accordance with some examples of this disclosure.

FIG. 3 illustrates the location and course of three vehicles 70A-70C relative to a specified location in space 84 ("location 84"), in accordance with some examples of this disclosure. In response to receiving a request from base station 80 for weather data at location 84, each of vehicles 70A-70C may calculate a confidence level based on parameters related to the estimated accuracy of each vehicle's weather data for location 84.

The two or more parameters may include a distance of distances 72A-72C between each of vehicles 70A-70C and location 84. For example, if distance 72A is shorter than distance 72B, a vehicle 70A may obtain more accurate weather data at location 84 than vehicle 70B. In some examples, the distance between a vehicle of vehicles 70A-70C and location 84 may be weighed more heavily than any other parameter because of the influence of distance on the accuracy of weather radar measurements. In other examples, another parameter may have a higher weight in a confidence model applied by a processor to the two or more parameters.

The two or more parameters may include an angle between a heading vector of heading vectors 74A-74C for a vehicle of vehicles 70A-70C and a vertical line through the vehicle. Heading vectors 74A-74C may indicate the direction that the noses or the front ends of vehicles 70A-70C are pointing during a measurement of the heading. In FIG. 3, the vertical lines through vehicles 70A-70C may be similar to the lines for altitude 78A-78C. Angles 76A-76C may be correlated with the accuracy of weather data obtained by vehicles 70A-70C because of the impact of the angle on the return signal energy. When vehicle 70C has a level heading 74C with a ninety-degree angle 76C to a vertical line through vehicle 70C, the weather radar on vehicle 76C may have higher accuracy than a vehicle travelling with a steeper heading and therefore a smaller angle from heading vector 74C to a vertical line.

The two or more parameters may include an altitude of altitudes 78A-78C for each of vehicles 70A-70C. If vehicle 70B has a higher altitude 78B than altitude 78C of vehicle 70C, vehicle 70B may have more accurate weather radar measurements because of less interference from the Earth's surface and curvature. In addition, there may be fewer obstacles to weather radar signals at higher altitudes than at lower altitudes.

The two or more parameters may include a radar capability of each of vehicles 70A-70C. The radar capability may be based on the specifications of the weather radar equipment on each of vehicles 70A-70C. For example, the radar capability may be based on the age, resolution, power, and quality of the weather radar equipment.

Figure 4:
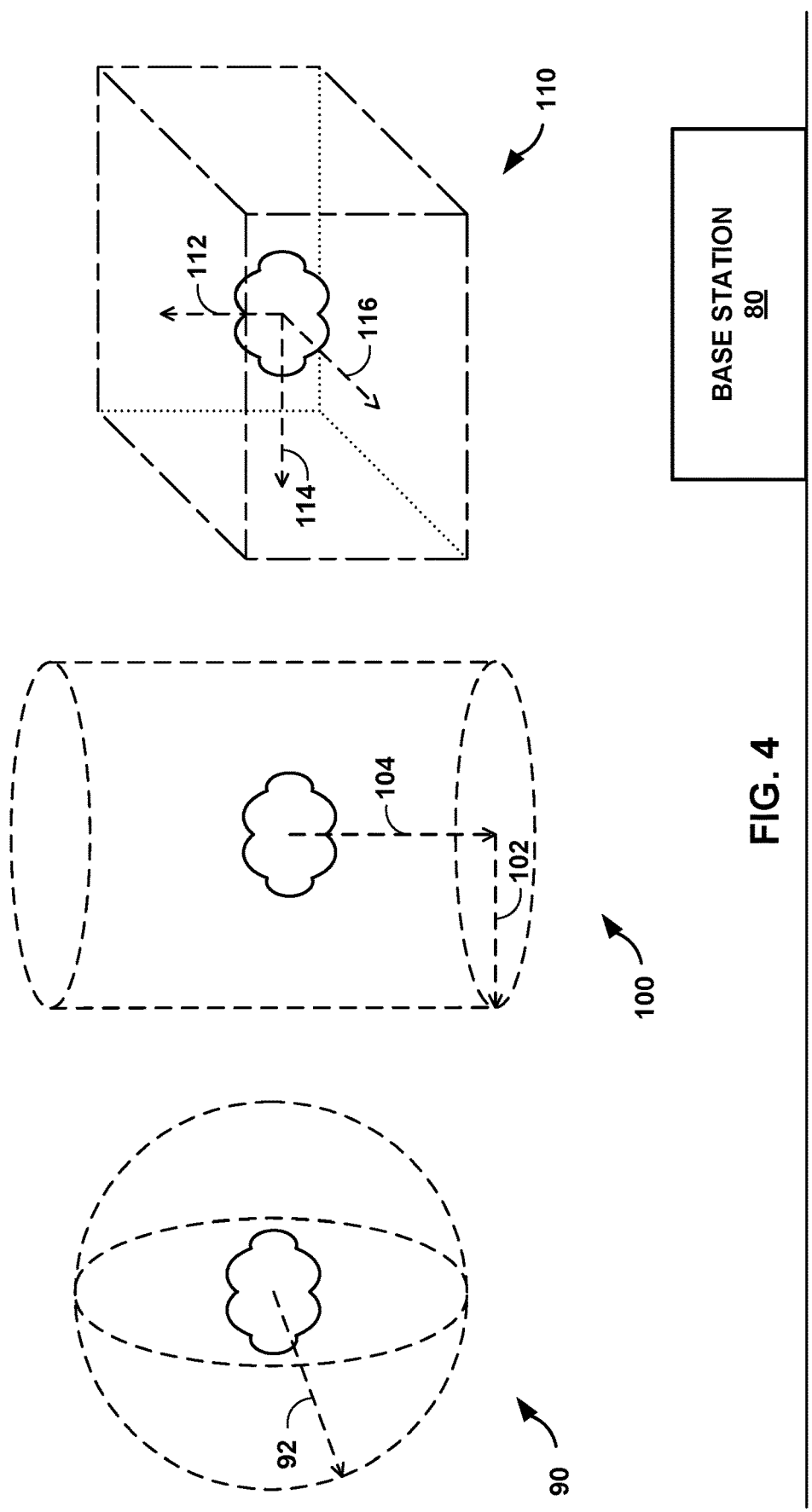
FIG. 4 illustrates three specified locations in space with one, two, or three range values, in accordance with some examples of this disclosure.

FIG. 4 illustrates three specified locations in space 90, 100, 110 ("locations 90, 100, 110") with one, two, or three range values, in accordance with some examples of this disclosure. Base station 80 may request weather data at one of locations 90, 100, 110 by transmitting a single point in space defined by latitude, longitude, and altitude to vehicles in the vicinity. The request may also include one or more range values to define a three-dimensional region surrounding the single point in space. The vehicles may interpret the meaning of the range values based on a convention or a standard. As used herein, "specified location in space" may refer to a single point in space without range values or a three-dimensional region surrounding a single point in space. "Specified location in space" may also refer to a single point, which may be defined by latitude, longitude, and altitude, that is inside a three-dimensional volume defined by the range values. In some examples, base station 80 may request weather data at a specified location in space without a range value, and a vehicle may collect weather data at or near the specified location in space.

In a first example with one range value, range value 92 defines a radius of a sphere for location 90. In some examples, a single range value may define half of a side of a cube structure. A vehicle may collect weather data for one or more points or locations within location 90, based on a request from base station 80.

In a second example with two range values, range value 102 defines a radius of a cylinder and range value 104 defines a vertical distance of the cylinder for location 100. In some examples, a first range value may define half of a longitudinal distance and half of a latitudinal distance of a box structure, where the longitudinal distance and the latitudinal distance are equal, and the second range value may define a vertical distance of the box structure. In the example of FIG. 4, range values 102, 104 define a cylindrical shape for location 100.

In a third example with three range values, range value 112 defines half of a vertical distance of a three-dimensional box structure, range value 114 defines half of a longitudinal distance of the box structure, and range value 116 defines half of a latitudinal distance of the box structure for location 110. In some examples, the first range value may indicate a longitudinal distance or a latitudinal distance, the second range value may indicate a vertical distance or a latitudinal distance, and the third range value may indicate a vertical distance or a longitudinal distance. The three-dimensional box structure may be centered on the latitude, longitude, and altitude transmitted by base station 80 in a request for weather data.

When a vehicle receives a request from base station 80 for weather data at one or more of locations 90, 100, 110, along with one or more range values, the vehicle may determine a confidence level before determining whether to collect the weather data. Alternatively, the vehicle may collect the weather data before determining the confidence level. The vehicle may actively collect weather data in the absence of a request from base station 80. The vehicle may use the weather data to plan the course of the vehicle or present the weather data to a user via a display device.

Figure 5:
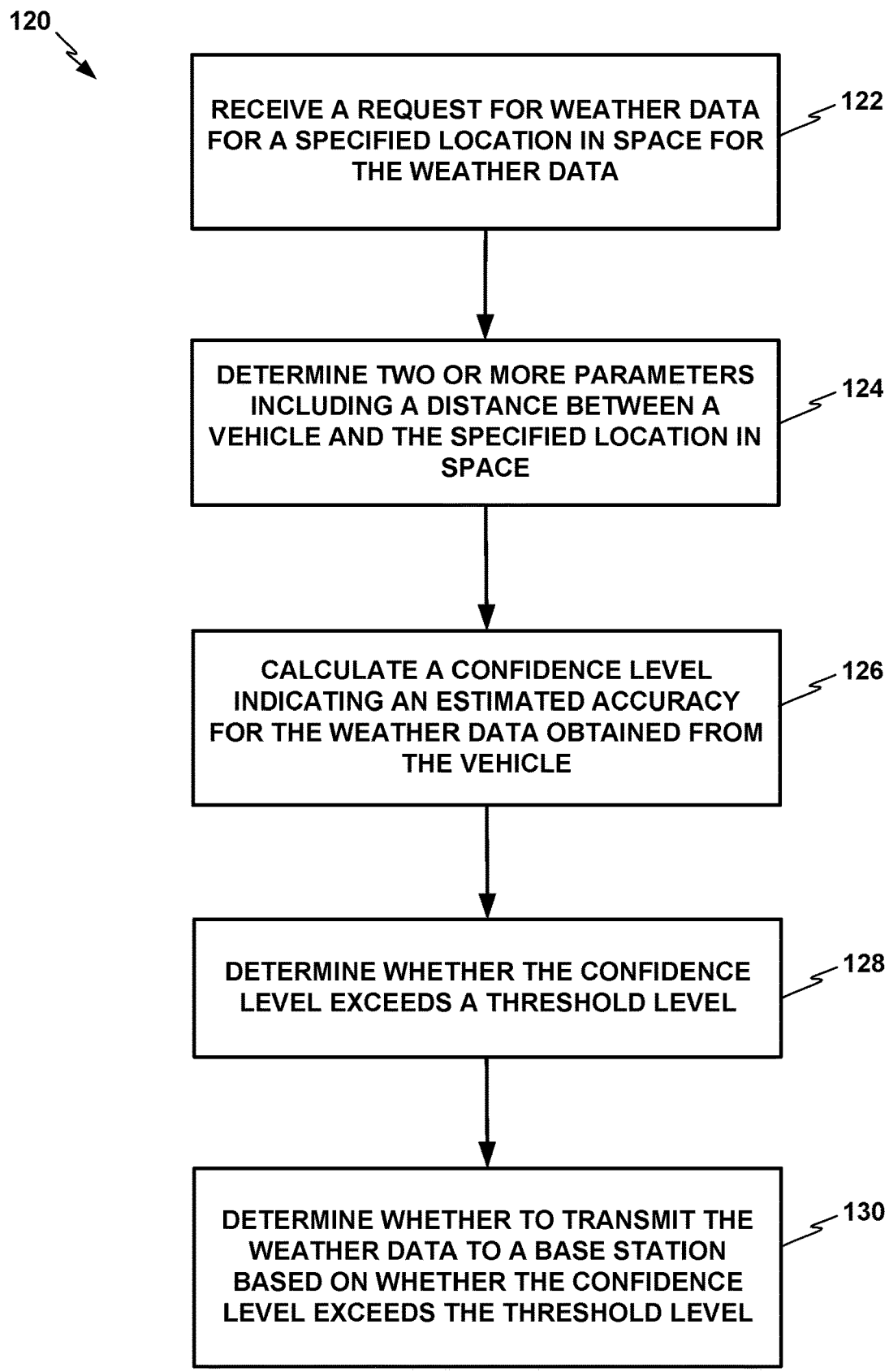
FIG. 5 shows a flowchart for an example technique for determining whether to transmit weather radar data based on a confidence level, in accordance with some examples of this disclosure.

FIG. 5 shows a flowchart for an example technique 120 for determining whether to transmit weather radar data based on a confidence level, in accordance with some examples of this disclosure. Technique 120 is described with reference to the system of FIG. 2, including processor 40, transceiver 44, and weather radar 50, although other devices and systems may exemplify similar techniques.

The technique of FIG. 5 includes receiving a request for weather data for a specified location in space for the weather data (122). Transceiver 44 on board vehicle 30 may receive the request from base station 36. The request may include a single point in space defined by latitude, longitude, and altitude, as well as one or more range values to define a three-dimensional region around the single point in space. In some examples, the request may identify more than one specified location in space or a range of locations.

The technique of FIG. 5 further includes determining two or more parameters, wherein a first parameter of the two or more parameters includes a distance between vehicle 30 and the specified location in space (124). Vehicle 30 may measure or determine the two or more parameters based on satellite navigation or onboard sensors. The parameters may further include altitude, radar capability, and an angle between the heading of vehicle 30 and a vertical line through vehicle 30. Radar capability, for example, may not change for vehicle 30 over time unless there is a radar upgrade or some other alteration. In contrast, altitude, distance, and the angle may change as vehicle 30 moves, climbs or descends, and turns along a course.

The technique of FIG. 5 further includes calculating a confidence level based on the two or more parameters, wherein the confidence level indicates an estimated accuracy for the weather data obtained from vehicle 30 (126). In order to estimate the accuracy, processor 40 may apply a confidence model to the parameters to calculate the confidence level. The confidence model may include weights for each parameter, as well as an equation or formula. In some examples, the equation may include summing or averaging the weighted parameters.

The technique of FIG. 5 further includes determining whether the confidence level exceeds a threshold level (128). In some examples, base station 36 may transmit the threshold level to vehicle 30. Vehicle 30 may store threshold level(s) for certain requests in a memory. The threshold level may be a minimum confidence level set by the requestor of the weather data.

The technique of FIG. 5 further includes determining whether to transmit the weather data to base station 36 based on whether the confidence level exceeds the threshold level (130). By not transmitting the weather data to base station 36 unless the confidence level exceeds the threshold level, vehicle 30 may reduce the throughput of data on the communication channel between vehicle 30 and base station 36. Instead of or in addition to transmitting the weather data, transceiver 44 may transmit the confidence level to base station 36. Base station 36 may determine how to use the weather data based on the confidence level, or base station may request the weather data based on the confidence level, for example, if no vehicle has a confidence level that exceeds the threshold level.

Figure 6:
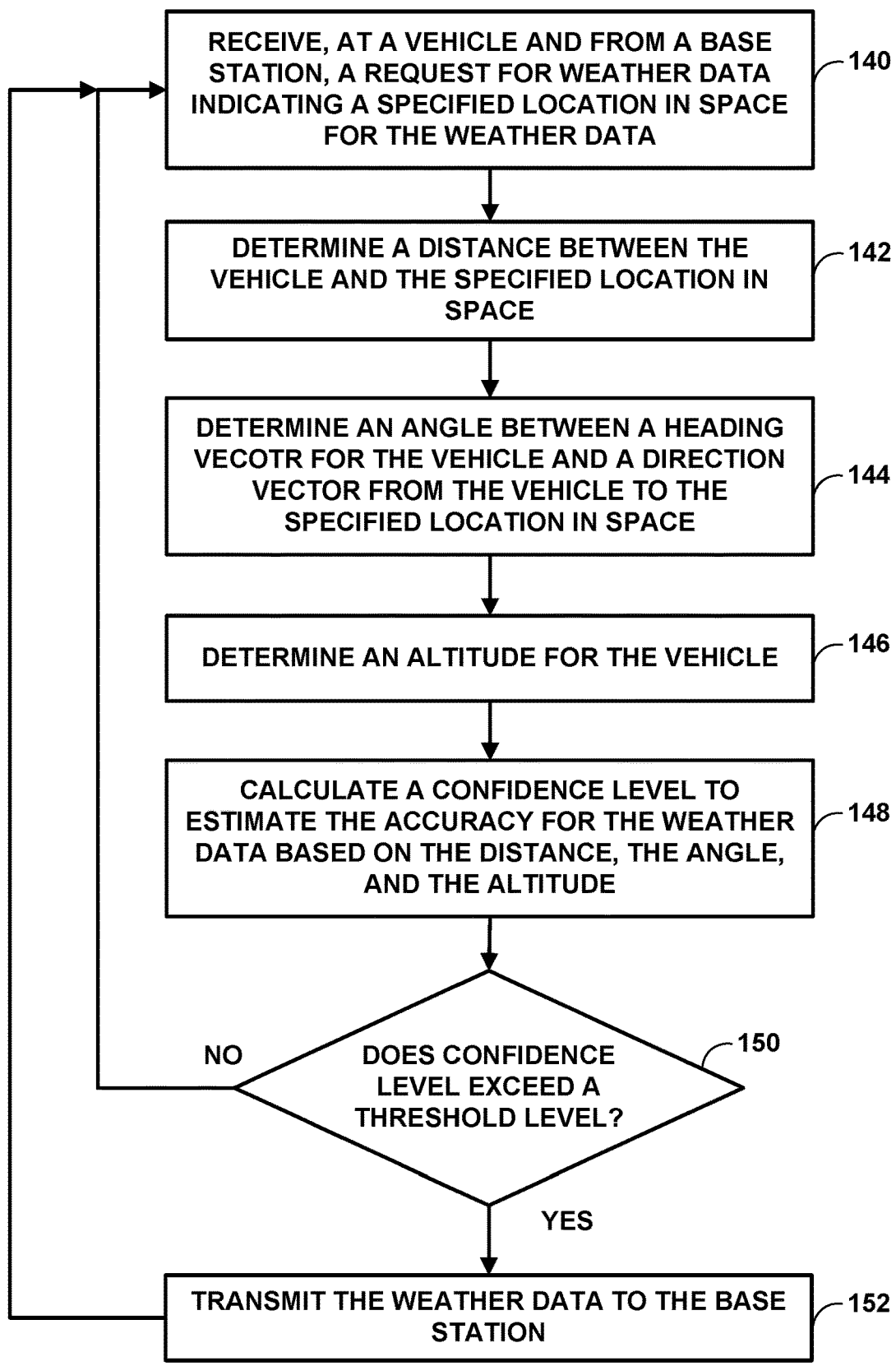
FIG. 6 shows a flowchart for an example technique for calculating a confidence level based on two or more parameters, in accordance with some examples of this disclosure.

FIG. 6 shows a flowchart for an example technique for calculating a confidence level based on two or more parameters, in accordance with some examples of this disclosure. The technique may include receiving a request for weather data indicating a specified location in space for the weather data (140). The technique may further include determining parameters such as the distance between a vehicle and the specified location in space, an angle between the heading of the vehicle and a vertical line through the vehicle, and/or an altitude of the vehicle (142, 144, 146). The technique may further include calculating a confidence level based on the parameters to estimate the accuracy of the weather data (148).

Table I depicts an example of three vehicles with various parameters. The technique includes applying a confidence model to the parameters, where the confidence model includes a weight for each parameter. The weight for the distance may be seventy percent, the weight for the angle may be twenty percent, and the weight for the altitude may be ten percent, expressed as the following equation:

$$\text{Confidence level}=0.7*(\text{distance parameter})+0.2(\text{angle parameter})+0.1*(\text{altitude parameter})$$

|   | Distance | Weighted distance | Angle | Weighted angle | Altitude | Weighted altitude | Confidence level |
|---|---|---|---|---|---|---|---|
| A | 140 nautical miles (nm) | 0.40 | 60° | 0.13 | 10,000 feet (ft) | 0.10 | 0.63 |
| B | 80 nm | 0.70 | 90° | 0.20 | 8,000 ft | 0.08 | 0.98 |
| C | 180 nm | 0.31 | 60° | 0.13 | 5,000 ft | 0.05 | 0.49 |

In some examples, the weighted distance parameter may be equal to eighty nautical miles divided by the distance multiplied by seventy percent. The weighted angle parameter may be equal to the angle divided by ninety degrees multiplied by twenty percent. For angles of more than ninety percent, the weighted angle parameter may be equal to one hundred and eighty degrees minus the angle, divided by ninety degrees, and then multiplied by twenty percent. The weighted altitude parameter may be equal to the altitude divided by ten thousand feet multiplied by ten percent. These formulas are merely exemplary and may be modified or replaced based on the implementation. In some examples, the confidence model be adjusted so that the maximum and minimum confidence levels are one and zero, respectively.

If the threshold level is ninety percent, then the technique of FIG. 6 may include transmitting the weather data to the base station (152). Vehicle B from Table I may transmit the weather data for the specified location in space to the base station. In some examples, vehicles A and C may refrain from transmitting weather data but may transmit their confidence levels to the base station.

Figure 7:
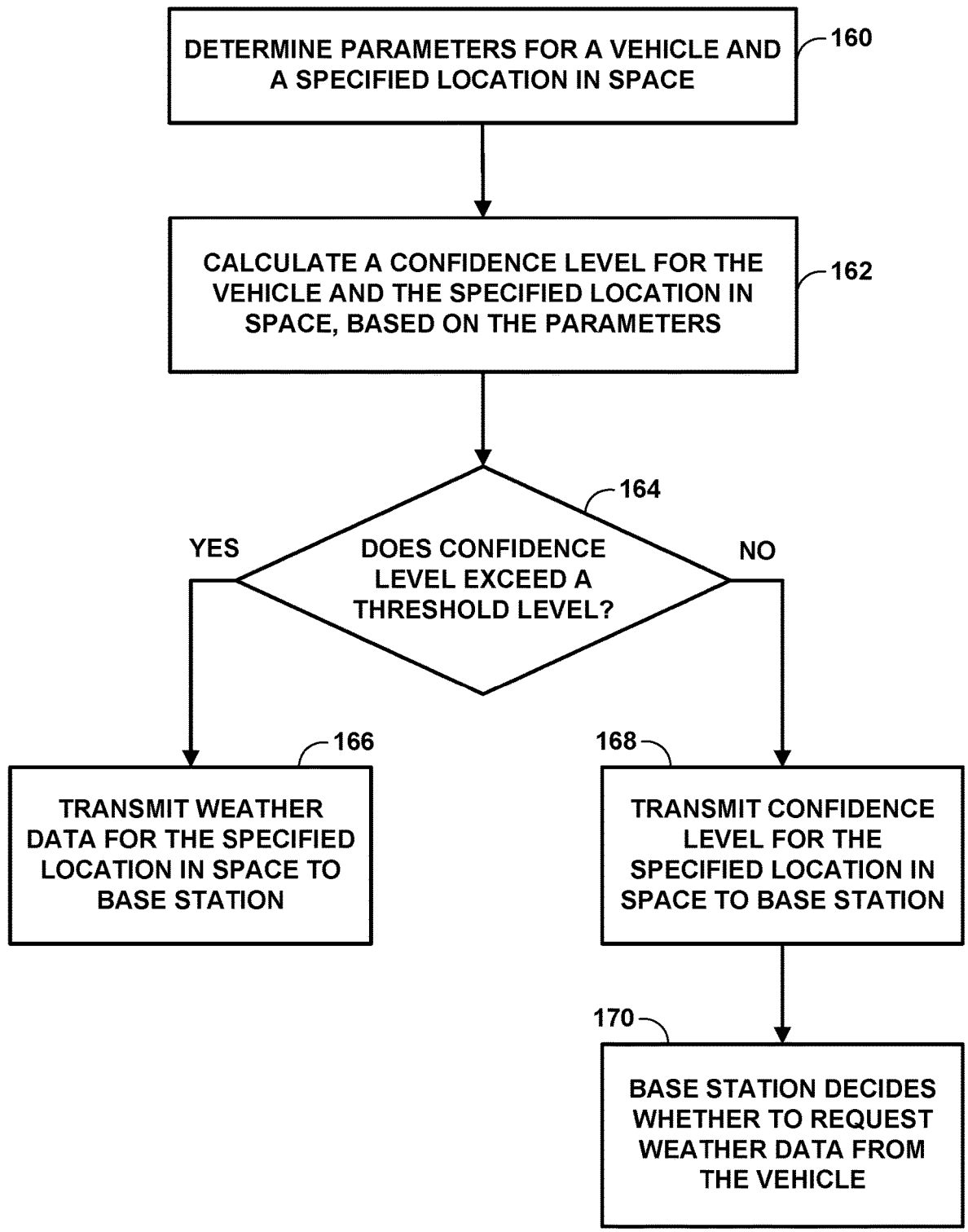
FIG. 7 shows a flowchart for an example technique for transmitting weather radar data or a confidence level to a base station, in accordance with some examples of this disclosure.

FIG. 7 shows a flowchart for an example technique for transmitting weather radar data or a confidence level to a base station, in accordance with some examples of this disclosure. According to the technique of FIG. 7, a processor on a vehicle first determines parameters for the vehicle and a specified location in space (160). The processor next calculates a confidence level for the vehicle and the specified location in space based on the parameters (162).

The processor then determines whether the confidence level exceeds a threshold level (164). If the processor determines that the confidence level exceeds the threshold level, the processor causes a transceiver to transmit the weather data for the specified location in space to a base station (166). If the processor determines that the confidence level does not exceed the threshold level, the processor causes a transceiver to transmit the confidence level for the specified location in space to a base station (168). In some examples, the processor may cause the transceiver to transmit parameters such as a distance, an angle, and an altitude to the base station, so that the base station may calculate the confidence level. The base station then decides whether to request weather data from the vehicle based on the confidence level (170). If the base station does not receive weather data for the specified location in space from a vehicle with an adequate confidence level, the base station may request the weather data from a vehicle with the highest confidence level.

Figure 8:
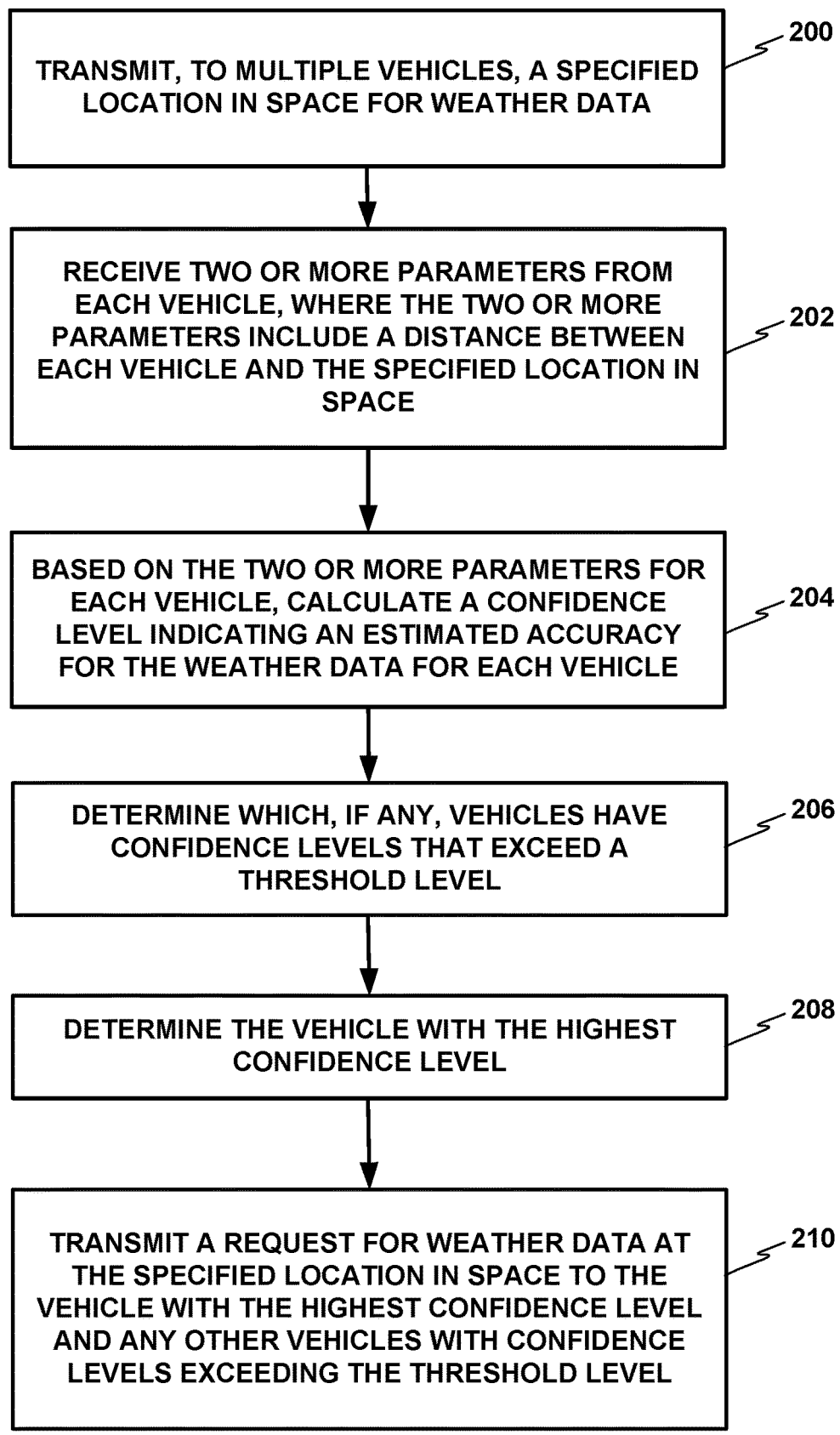
FIG. 8 shows a flowchart for an example technique for requesting weather radar data from multiple vehicles, in accordance with some examples of this disclosure.

FIG. 8 shows a flowchart for an example technique for requesting weather radar data from multiple vehicles, in accordance with some examples of this disclosure. The technique of FIG. 8 is described as performed by a base station, but a vehicle or another device or system may also perform the technique of FIG. 8. According to the technique of FIG. 8, a base station transmits a specified location in space for weather data to multiple vehicles (200). In some examples, the base station may transmit the specified location in space for weather data to a single vehicle. The base station may also transmit a confidence level to the vehicles. The base station receives two or more parameters from each vehicle, including a distance between each vehicle and the specified location in space (202). The base station then calculates, based on the parameters, a confidence level indicating an estimated accuracy for the weather data for each vehicle (204).

The base station then determines which, if any, vehicles have confidence levels that exceed a threshold level (206). The base station also determines the vehicle with the highest confidence level (208). The base station then transmits a request for weather data at the specified location in space to the vehicle with the highest confidence level and any other vehicles with confidence levels exceeding the threshold level (210). The technique of FIG. 8 may conserve processing resources at the vehicles, instead using processing resources in the base station to calculate the confidence levels.

In some examples, the technique of FIG. 8 may further include determining that the confidence level(s) do not exceed the threshold level. Based on determining that the confidence level(s) do not exceed the threshold level, the base station may transmit a specified location in space for weather data to another vehicle. The base station may then receive parameters from the other vehicle and calculate another confidence level for the other vehicle. If the other confidence level exceeds the threshold level, the base station may transmit a request for weather data to the other vehicle.

The techniques of this disclosure may be implemented in a device or article of manufacture including a computer-readable storage medium. The term "processor," as used herein may refer to any of the foregoing structure or any other structure suitable for processing program code and/or data or otherwise implementing the techniques described herein. Elements of processor 40, user interface 42, transceiver 44, display device 48, and weather radar 50 may be implemented in any of a variety of types of solid state circuit elements, such as CPUs, CPU cores, GPUs, digital signal processors (DSPs), application-specific integrated circuits (ASICs), a mixed-signal integrated circuits, field programmable gate arrays (FPGAs), microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein.

Memory 46 of FIG. 2 is intended to collectively represent all memory of vehicle 30 and processor 40. One or more memory devices of memory 46 may include any volatile or non-volatile media, such as a RAM, ROM, non-volatile RAM (NVRAM), electrically erasable programmable ROM (EEPROM), flash memory, and the like. One or more memory devices of memory 46 may store computer readable instructions that, when executed by one or more processors of processor 40, cause the one or more processors of processor 40 to implement the techniques attributed herein to processor 40, transceiver 44, and/or weather radar 50.

Elements of processor 40, transceiver 44, and/or weather radar 50 may be programmed with various forms of software. Processor 40, transceiver 44, and/or weather radar 50 may be implemented at least in part as, or include, one or more executable applications, application modules, libraries, classes, methods, objects, routines, subroutines, firmware, and/or embedded code, for example. Elements of processor 40, transceiver 44, and/or weather radar 50 as in any of the examples herein may be implemented as a device, a system, an apparatus, and may embody or implement a method of comparing and de-conflicting weather data from multiple sources and generating weather data correction outputs, including for implementing example technique 120 as described with reference to FIG. 5. Processor 40, transceiver 44, and/or weather radar 50 may configure one or more processors of processor 40 to receive a request for weather data at a specified location in space; calculate a confidence level; transmit the confidence level and/or weather data to base station 36; and perform any other functions described herein.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

A "vehicle" may be an aircraft, a land vehicle such as an automobile, or a water vehicle such as a ship or a submarine. An "aircraft" as described and claimed herein may include any fixed-wing or rotary-wing aircraft, airship (e.g., dirigible or blimp buoyed by helium or other lighter-than-air gas), suborbital spaceplane, spacecraft, expendable or reusable launch vehicle or launch vehicle stage, or other type of flying device. An "aircraft" as described and claimed herein may include any crewed or uncrewed craft (e.g., uncrewed aerial vehicle (UAV), flying robot, or automated cargo or parcel delivery drone or other craft). "Weather information" may be considered to be a form of and included in "weather data" for purposes of this disclosure.

The following examples may illustrate one or more of the techniques of this disclosure.

Example 1. A method for processing weather data, where the method includes receiving, at a vehicle and from a base station, a request for weather data, wherein the request comprises an indication of a specified location in space for the weather data. The method further includes determining two or more parameters, wherein a first parameter of the two or more parameters comprises a distance between the vehicle and the specified location in space. The method further includes calculating a confidence level based on the two or more parameters, wherein the confidence level indicates an estimated accuracy for the weather data obtained from the vehicle. The method further includes determining whether the confidence level exceeds a threshold level and determining whether to transmit the weather data to the base station based on whether the confidence level exceeds the threshold level.

Example 2. The method of example 1, further comprising transmitting the confidence level to the base station.

Example 3. The method of any combination of examples 1 and 2, further comprising determining that the confidence level does not exceed the threshold level, refraining from transmitting the weather data to the base station based on determining that the confidence level does not exceed the threshold level, and transmitting the confidence level to the base station based on determining that the confidence level does not exceed the threshold level.

Example 4. The method of any combination of examples 1-3, wherein a second parameter of the two or more parameters comprises an angle between a heading vector for the vehicle and a vertical line through the vehicle, and a third parameter of the two or more parameters comprises an altitude for the vehicle.

Example 5. The method of any combination of examples 1-4, wherein a fourth parameter of the two or more parameters comprises a radar capability for the vehicle.

Example 6. The method of any combination of examples 4 and 5, wherein calculating the confidence level based on the two or more parameters comprises applying a confidence model that specifies a first respective weight for the distance, a second respective weight for the angle, a third respective weight for the altitude. The first respective weight for the distance is larger than the second respective weight for the angle, and the first respective weight for the distance is larger than the third respective weight for the altitude.

Example 7. The method of any combination of examples 4-6, further comprising transmitting the distance, the angle, and the altitude to the base station.

Example 8. The method of any combination of examples 1-7, further comprising outputting the weather data to an output device.

Example 9. The method of any combination of examples 1-8, wherein the indication for the specified location in space comprises a latitude for the specified location in space, a longitude for the specified location in space, an altitude for the specified location in space, and at least one range value.

Example 10. The method of example 9, wherein the at least one range value comprises a radius of a sphere centered on the specified location in space.

Example 11. The method of any combination of examples 9 and 10, wherein the at least one range value comprises three distance values indicating three sides of a three-dimensional box centered on the specified location in space.

Example 12. The method of any combination of examples 9-11, further comprising storing the threshold level to a memory.

Example 13. A system for processing weather data onboard a vehicle, where the system includes a transceiver configured to receive, from a base station, a request for weather data, wherein the request comprises an indication of a specified location in space for the weather data. The system further includes a processing circuitry configured to determine two or more parameters, wherein a first parameter of the two or more parameters comprises a distance between the vehicle and the specified location in space. The processing circuitry is further configured to calculate a confidence level based on the two or more parameters, wherein the confidence level indicates an estimated accuracy for the weather data obtained from the vehicle. The processing circuitry is further configured to determine whether the confidence level exceeds a threshold level and determine whether to transmit the weather data to the base station based on whether the confidence level exceeds the threshold level.

Example 14. The system of example 13, wherein processing circuitry is further configured to cause the transceiver to transmit the confidence level to the base station.

Example 15. The system of any combination of examples 13 and 14, wherein the processing circuitry is further configured to determine that the confidence level does not exceed the threshold level, cause the transceiver to refrain from transmitting the weather data to the base station based on the processing circuitry determining that the confidence level not exceeding the threshold level, and cause the transceiver to transmit the confidence level to the base station based on the processing circuitry determining that the confidence level not exceeding the threshold level.

Example 16. The system of any combination of examples 13-15, wherein a second parameter of the two or more parameters comprises an angle between a heading vector for the vehicle and a vertical line through the vehicle, and a third parameter of the two or more parameters comprises an altitude for the vehicle.

Example 17. The system of any combination of examples 13-16, wherein a fourth parameter of the two or more parameters comprises a radar capability for the vehicle.

Example 18. The system of any combination of examples 16 and 17, wherein the processing circuitry is configured to calculate the confidence level based on the two or more parameters by at least applying a confidence model that specifies a first respective weight for the distance, a second respective weight for the angle, a third respective weight for the altitude. The first respective weight for the distance is larger than the second respective weight for the angle, and the first respective weight for the distance is larger than the third respective weight for the altitude.

Example 19. The system of any combination of examples 16-18, wherein the processing circuitry is configured to cause the transceiver to transmit the distance, the angle, and the altitude to the base station.

Example 20. The system of any combination of examples 13-19, further comprising an output device, wherein the processing circuitry is further configured to output the weather data to the output device.

Example 21. The system of any combination of examples 13-20, wherein the indication for the specified location in space comprises a latitude for the specified location in space, a longitude for the specified location in space, an altitude for the specified location in space, and at least one range value.

Example 22. The system of example 21, wherein the at least one range value comprises a radius of a sphere centered on the specified location in space.

Example 23. The system of any combination of examples 21 and 22, wherein the at least one range value comprises three distance values indicating three sides of a three-dimensional box centered on the specified location in space.

Example 24. The system of any combination of examples 13-23, further comprising a memory configured to store the threshold level.

Example 25. A method for collecting weather data comprises transmitting, at a base station and to a vehicle, an indication of a specified location in space for the weather data, and receiving, at the base station and from the vehicle, two or more parameters, wherein a first parameter of the two or more parameters comprises a distance between the vehicle and the specified location in space. The method further comprises calculating a confidence level based on the two or more parameters, wherein the confidence level indicates an estimated accuracy for the weather data obtained from the vehicle. The method further comprises determining whether the confidence level exceeds a threshold level, and transmitting, from the base station and to the vehicle, a request for weather data at the specified location in space based on whether the confidence level exceeds the threshold level.

Example 26. The method of example 25, further comprising determining that the confidence level does not exceed a threshold level, and transmitting, based on determining that the confidence level does not exceed a threshold level and to a second vehicle, the indication of the specified location in space for the weather data. The method further comprises receiving, at the base station and from the second vehicle, two or more parameters for the second vehicle, wherein a first parameter of the two or more parameters for the second vehicle comprises a distance between the second vehicle and the specified location in space. The method further comprises calculating a second confidence level based on the two or more parameters for the second vehicle, wherein the second confidence level indicates a second estimated accuracy for the weather data obtained from the second vehicle. The method further comprises determining whether the second confidence level exceeds the threshold level, and transmitting, from the base station and to the second vehicle, a second request for weather data at the specified location in space based on whether the second confidence level exceeds the threshold level.

Example 27. A device that includes a computer-readable medium having executable instructions stored thereon that is configured to be executable by one or more processors for causing the one or more processors to perform any combination of methods of examples 1-12, 25, and 26.

Various examples have been described. These and other examples are within the scope of the following claims.

What is claimed is:

1. A method for processing weather data, the method comprising:
   receiving, at a vehicle and from a base station, a request for weather data, wherein the request comprises an indication of a specified location in space for the weather data;
   determining two or more parameters;
   calculating a confidence level based on the two or more parameters, wherein the confidence level indicates an estimated accuracy for the weather data obtained from the vehicle;
   determining that the confidence level exceeds a threshold level; and
   transmitting the weather data to the base station in response to determining that the confidence level exceeds the threshold level.

2. The method of claim 1, wherein a parameter of the two or more parameters comprises an angle between a heading vector for the vehicle and a vertical line through the vehicle.

3. The method of claim 1, wherein a parameter of the two or more parameters comprises an altitude of the vehicle.

4. The method of claim 1, wherein a parameter of the two or more parameters comprises a radar capability for the vehicle.

5. The method of claim 1, wherein the two or more parameters comprise:
   an angle between a heading vector for the vehicle and a vertical line through the vehicle; and
   an altitude of the vehicle,
   wherein calculating the confidence level based on the two or more parameters comprises applying a confidence model that specifies a first respective weight for the angle and a second respective weight for the altitude, and
   wherein the first respective weight for the angle is larger than the second respective weight for the altitude.

6. The method of claim 1, further comprising transmitting the confidence level to the base station.

7. The method of claim 1, further comprising:
   determining that the confidence level does not exceed the threshold level;
   refraining from transmitting the weather data to the base station in response to determining that the confidence level does not exceed the threshold level; and
   transmitting the confidence level to the base station in response to determining that the confidence level exceeds the threshold level.

8. A system for processing weather data onboard a vehicle, the system comprising:
   a transceiver configured to receive, from a base station, a request for weather data, wherein the request comprises an indication of a specified location in space for the weather data; and processing circuitry configured to:
　determine two or more parameters;
　calculate a confidence level based on the two or more parameters, wherein the confidence level indicates an estimated accuracy for the weather data obtained from the vehicle,
　determine that the confidence level exceeds a threshold level, and
　cause the transceiver to transmit the weather data to the base station in response to determining that the confidence level exceeds the threshold level.

9. The system of claim 8, wherein a first parameter of the two or more parameters comprises an angle between a heading vector for the vehicle and a vertical line through the vehicle.

10. The system of claim 8, wherein a second parameter of the two or more parameters comprises an altitude of the vehicle.

11. The system of claim 8, wherein a third parameter of the two or more parameters comprises a radar capability for the vehicle.

12. The system of claim 8, wherein the two or more parameters comprise:
　an angle between a heading vector for the vehicle and a vertical line through the vehicle; and
　an altitude of the vehicle,
　wherein the processing circuitry is configured to calculate the confidence level based on the two or more parameters comprises applying a confidence model that specifies a first respective weight for the angle and a second respective weight for the altitude, and
　wherein the first respective weight for the angle is larger than the second respective weight for the altitude.

13. The system of claim 8, wherein the processing circuitry is further configured to transmit the confidence level to the base station.

14. The system of claim 8, wherein the processing circuitry is further configured to:
　determine that the confidence level does not exceed the threshold level;
　cause the transceiver to refrain from transmitting the weather data to the base station based on the processing circuitry determining that the confidence level not exceeding the threshold level; and
　cause the transceiver to transmit the confidence level to the base station in response to determining that the confidence level exceeds the threshold level.

15. The system of claim 8, wherein the indication for the specified location in space comprises:
　a latitude for the specified location in space;
　a longitude for the specified location in space;
　an altitude for the specified location in space; and
　at least one range value.

16. The system of claim 15, wherein the at least one range value comprises a radius of a sphere centered on the specified location in space.

17. The system of claim 15, wherein the at least one range value comprises three distance values indicating three sides of a three-dimensional box centered on the specified location in space.

18. A device comprising a computer-readable medium having executable instructions stored thereon, configured to be executable by processing circuitry for causing the processing circuitry to:
　receive, from a base station, a request for weather data, wherein the request comprises an indication of a specified location in space for the weather data;
　determine two or more parameters;
　calculate a confidence level based on the two or more parameters, wherein the confidence level indicates an estimated accuracy for the weather data obtained from the vehicle;
　determine whether the confidence level exceeds a threshold level; and
　determine whether to transmit the weather data to the base station based on whether the confidence level exceeds the threshold level.

19. The device of claim 18,
　wherein a first parameter of the two or more parameters comprises an angle between a heading vector for the vehicle and a vertical line through the vehicle, and
　wherein a second parameter of the two or more parameters comprises an altitude of the vehicle.

20. The device of claim 18, wherein the instructions are configured to be executable by the processing circuitry for causing the processing circuitry to:
　determine that the confidence level does not exceed the threshold level;
　refrain from transmitting the weather data to the base station based on determining that the confidence level does not exceed the threshold level; and
　transmit the confidence level to the base station based on determining that the confidence level exceeds the threshold level.

* * * * *